United States Patent [19]

Sawada et al.

[11] Patent Number: 4,825,529
[45] Date of Patent: May 2, 1989

[54] FRAMING BAR CONNECTING METHOD

[75] Inventors: Nobuyoshi Sawada; Kenji Takeshima, both of Toyama, Japan

[73] Assignee: Origin Co., Ltd., Tokyo, Japan

[21] Appl. No.: 47,841

[22] Filed: May 6, 1987

[30] Foreign Application Priority Data

Sep. 20, 1986 [JP] Japan .............................. 61-144854[U]
Mar. 9, 1987 [JP] Japan ................................. 62-053658

[51] Int. Cl.⁴ ............................................. B23P 19/00
[52] U.S. Cl. ..................................... 29/525.1; 403/402
[58] Field of Search ............. 29/526 R, 453; 403/297, 403/402, 401

[56] References Cited

U.S. PATENT DOCUMENTS 4,538,936  3/1985  Zeidl ..................................... 403/402
4,694,598  9/1987  Eisenloeffel ..................... 403/402 X
4,714,373  12/1987 Heekin ................................. 403/402

Primary Examiner—Charlie T. Moon
Attorney, Agent, or Firm—Flynn, Thiel, Boutell, & Tanis

[57] ABSTRACT

A framing bar connecting method for forming a frame by connecting adjacent framing bars with framing bar connectors. Each framing bar connector comprises: an L-shaped connecting plate having right-angled first and second arms, a slot formed in the first arm and threaded holes formed in the second arm; an L-shaped bottom plate having right-angled first and second arms and an opening formed in the first arm; and a lever provided with a cam at the base end thereof. In assembling a frame, the first arm of the connecting plate and the first arm of the bottom plate are inserted together with the lever in the dovetail groove of one of framing bars, the second arm of the connecting plate and the second arm of the bottom plate are inserted in the dovetail groove of the other framing bar, screws are screwed through the threaded holes of the second arm of the connecting plate to press the second arm of the connecting plate and the second arm of the bottom plate firmly against the inner surfaces of the dovetail groove, and then the lever is turned down so that the nose of the cam catches the bottom surface of the dovetail groove firmly and the cam presses the first arm of the connecting plate firmly against the inner surface of the dovetail groove as the lever is turned.

5 Claims, 3 Drawing Sheets

FRAMING BAR CONNECTING METHOD

BACKGROUND OF THE INVENTION

1. Field of the Invention

The present invention relates to a framing bar connecting method for forming a frame by assembling framing bars of a light metal, such as aluminum.

2. Description of the Prior Art

To form such a frame by assembling framing bars, an L-shaped connecting plate having right-angled arms which are inserted in dovetail grooves formed in the adjacent framing bars, respectively, has been used. There are various fixing means for fixing the connecting plate to the framing bars. For example, the arms of a connecting plate are wedged into the dovetail grooves of the adjacent framing bars, the serrated arms of a connecting plate are driven into the dovetail grooves of the adjacent framing bars so that the serrations cut into the inner surfaces of the dovetail grooves or the arms of a connecting plate are inserted in the dovetail grooves of the adjacent framing bars and are fastened to the framing bars with screws.

Most conventional connecting plates need to be struck to drive the arms into the dovetail grooves of the adjacent framing bars. Therefore, it is possible that the framing bars are damaged or warped by the impact applied to the connecting plate, and the joint is liable to become loose or the adjacent framing bars are dislocated relative to each other. Fastening the connecting plate to the framing bars with screws requires much time and reduces the efficiency of frame assembling work.

To overcome such disadvantages of the conventional connecting plate, various framing bar connecting methods applying the principle of a lever have been proposed and applied practically. These framing bar connecting methods do not require striking the connecting member and enable fixedly connecting the framing bars through simple operation. Typically, those framing bar connecting methods employ a lever provided with an eccentric cam at the base end thereof and, in fastening a connecting plate to the framing bar, the lever is turned so that the eccentric cam urges the connecting plate away from the bottom surface of the dovetail groove of the framing member and presses the connecting plate against the inner surfaces of the upper edges of the dovetail groove.

Ordinarily, such a lever is formed by casting a hard metal such as iron because the lever has a complex shape, while the framing bar is formed of a soft light metal such as aluminum. Accordingly, the nose of the eccentric cam bites deep in the bottom surface of the dovetail groove of the framing bar to make turning the lever difficult and, in the worst case, the pivots extending across the eccentric cam is broken when the lever is turned forcibly. Since the bottom surface of the dovetail groove is thus scraped and damaged by the eccentric cam, the fastening force of the lever is not applied effectively to the connecting plate and the framing bar and, when the frame is assembled and disassembled repeatedly, the fastening effect of the lever is reduced accordingly.

SUMMARY OF THE INVENTION

Accordingly, it is an object of the present invention to provide a framing bar connecting method employing a lever having a cam which will not cut into the inner surface of the dovetail groove of a framing bar so that the lever can be easily turned, and will not damage the inner surface of the dovetail groove of the framing member by scraping so that the fastening effect of the lever is maintained.

To achieve the object of the invention, the present invention provides a framing bar connecting method for forming a frame by firmly connecting adjacent framing bars each having a dovetail groove, employing an L-shaped connecting plate having right-angled arms which can be received in the dovetail grooves of the adjacent framing bars, respectively, and a lever provided at the base end thereof with a cam having a nose, which comprises: combining the connecting plate and the lever by passing the lever through a slit formd in one of the arms of the connecting plate so that the cam is placed under the connecting plate and the lever extends upward through the slit; inserting the arms of the connecting plate in the dovetail grooves of the adjacent framing bars; turning screws screwed through threaded holes formed in the other arm of the connecting plate to move the other arm away from the bottom surface of the dovetail groove of the framing bar and to press the other arm against the inner surfaces of the edges of the dovetail groove; and turning the lever so that the nose of the cam comes into contact with the bottom surface of the dovetail groove of the framing bar and the connecting plate is moved away from the bottom surface of the dovetail groove and is pressed firmly against the inner surfaces of the edges of the dovetail groove with the pivots laterally extending from the cam.

When the lever is turned, the nose of the cam catches the bottom surface of the dovetail groove of the framing bar firmly while the cam surface of the cam slides along the lower surface of the connecting plate pushing up the connecting plate to press the connecting plate firmly against the inner surfaces of the edges of the dovetail groove. Accordingly, the lever can be easily turned and the nose of the cam cuts in the bottom surface of the dovetail groove only be a negligibly small depth without scraping the bottom surface of the dovetail groove.

The above and other objects, features and advantages of the present invention will become more apparent from the following description taken in conjunction with the accompanying drawings.

DESCRIPTION OF THE PREFERRED EMBODIMENTS

Figure 1:
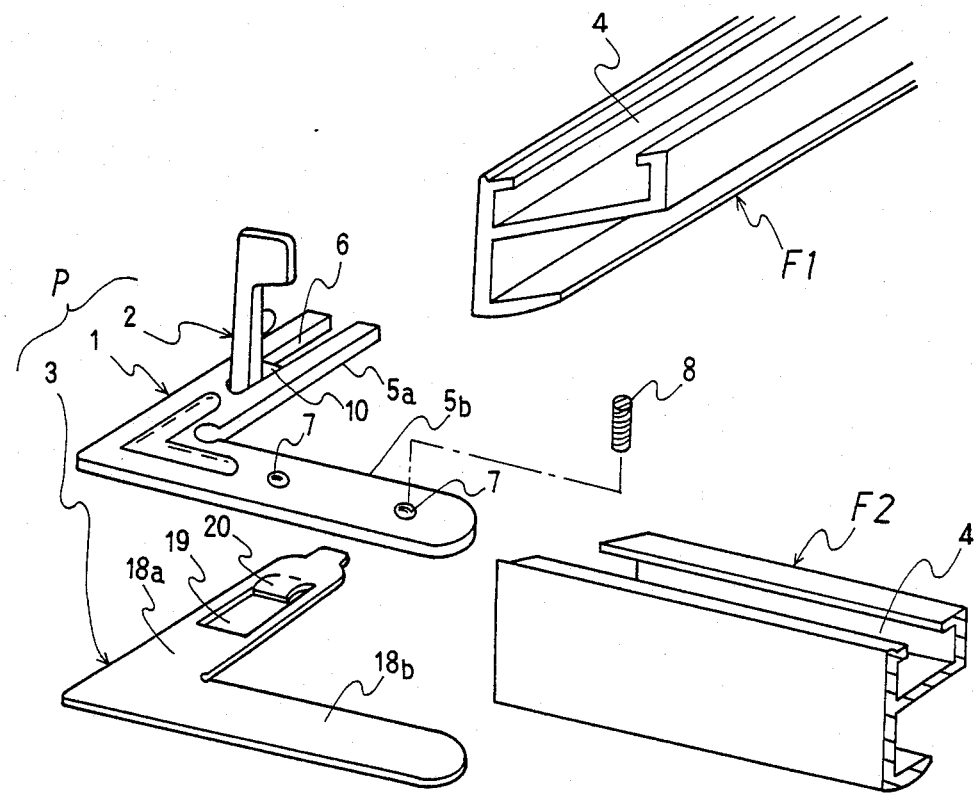
FIG. 1 is an exploded perspective view showing the members of a framing bar connector employed in the present invention in combination with framing bars.
Figure 2:
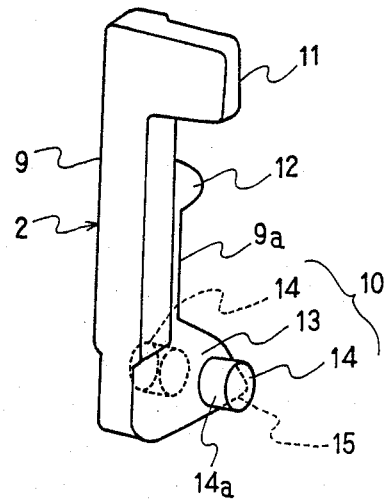
FIG. 2 is a perspective view of the lever of the framing bar connector of FIG. 1.
Figure 3:
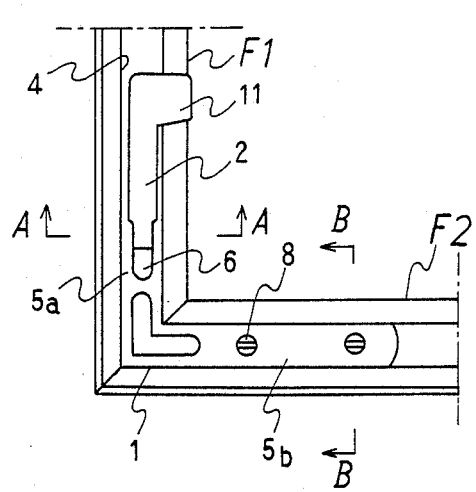
FIG. 3 is a plan view showing adjacent framing bars connected by the framing bar connector of FIG. 1.
Figure 4:
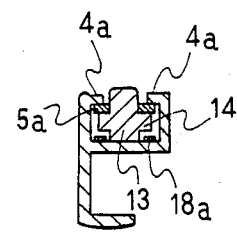
FIGS. 4 and 5 are sectional views taken on lines A—A and B—B in FIG. 3, respectively.

Referring to FIGS. 1 to 7 showing a framing bar connector employed in a first embodiment of the present invention, framing bars F1 and F2 each has a dovetail groove 4 on the backside thereof. A framing bar connector P comprises an L-shaped connecting plate 1, a lever 2 and a bottom connecting plate 3. The connecting plate 1 has right-angled arms 5a and 5b which are received in the dovetail grooves 4 of the framing bars F1 and F2, respectively. A slot 6 is formed in the arm 5a so as to open at the free end of the arm 5a to receive the lever 2 therein for free turning. Two threaded holes 7 are formed in the other arm 5b of the connecting plate 1. The lever 2 has a stem 9, a cam section 10 formed at the base end of the stem 9 and including a cam 13 and pivots 14 laterally projecting from the opposite sides of the cam 13, respectively, a lug 11 formed at the free end of the stem 9, and a protrusion 12 (FIG. 2) formed in the middle portion of the stem 9. The cam 13 is formed of a width so as to fit the slot 6 and extends from the base end of the stem 9 in a direction in which the lever 2 is turned to fasten the connecting plate 1 to the framing bar 4 tapering toward the nose 15 thereof. A rib 9a fitting the slot 6 is formed on one side of the stem 9 facing a direction in which the lever 2 is turned. The protrusion 12 is formed at the upper end of the rib 9a so that the protrusion 12 will enter the slot 6 before the rib 9a when the lever 2 is turned to fasten the connecting plate 1 to the framing bar 4. The lug 11 extends toward the inside of the frame. Since the lever 2 has the protrusion 12, the lever 2 can not be passed upwardly through the slit 6 from below the arm 5a. The lever 2 is inserted in the slot 6 through the open end of the slit 6. A closed-end slot may be formed instead of the open-end slot 6 in the arm 5a when the lever 2 is so formed as to be able to be passed through the slot from below the arm 5a.

The L-shaped bottom plate 3 and the connecting plate 1 are substantially the same in shape (FIG. 1). The bottom plate 3 has arms 18a and 18b which are received in the dovetail grooves 4 of the framing members F1 and F2, respectively. An opening 19 allowing the nose 15 of the cam 13 to project down therethrough is formed in the arm 18a, and part of the arm 18a at the outer end of the opening 19 is raised by pressing to form a stopper 20.

Figure 5:
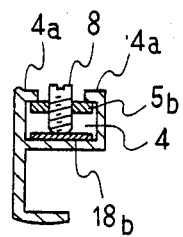

In connecting the adjacent framing bars F1 and F2 by the framing bar connector P, screws 8 are screwed in the threaded holes 7 of the connecting plate 1, then the connecting plate 1 is placed on the bottom plate 3, then the arms 5b and 18b are inserted in the dovetail groove 4 of the framing bar F2 in place, and then the screws 8 are screwed further to press the arm 18b against the bottom surface of the dovetail groove 4 of the framing bar F2 and to press the arm 5b of the connecting plate 1 against the inner surfaces of the edges 4a of the dovetail groove 4 of the framing bar F2 so that the arms 5b and 18b are secured firmly to the framing member F2 as shown in FIG. 5. In this state, the arms 5a and 18a are held at a fixed distance from each other.

Then, the lever 2 is inserted in the slot 6 of the arm 5a through the open end of the slot 6 resiliently bending the arm 18a until the cam 13 is moved over the stopper 20 into the opening 19. Once the cam 13 has dropped in the opening 19, the cam 13 is able to move only in the range of the opening 19 and the pivots 14 rest on the arm 18a of the bottom plate 3, so that the lever 2 is movably held between the arms 5a and 18a. Then, the arms 5a and 18a are inserted in the dovetail groove 4 of the other framing member F1 together with the lever 2.

Figure 7:
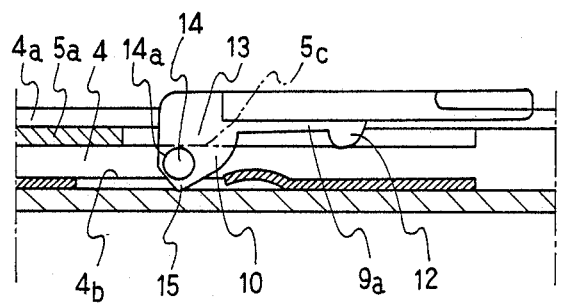

Then, the respective edges of the framing members F1 and F2 are joined correctly together, and then the lever 2 is turned so that the nose 15 of the cam 13 engages the bottom surface 4b of the dovetail groove 4 and thereby the pivots 14 engages the lower surface 5c of the arm 5a to press the arm 5a firmly upwardly against the inner surfaces of the edges 4a of the dovetail groove 4 as illustrated in FIG. 7. Thus, the arm 5a is secured to the framing member F1.

When the lever 2 is turned, the nose 15 of the cam 13 catches the bottom surface 4b of the dovetail groove 4 firmly while the pivots 14 slide along the lower surface of the arm 5a, so that the nose 15 of the cam 13 will neither cut deep in nor scrape the bottom surface 4b of the dovetail groove 4 and the lever 2 is turned on the nose 15 of the cam 13. Since the nose 15 of the cam cuts into the bottom surface 4b of the dovetail groove 4 scarcely or only a little at a fixed position, the pressure of the cam 13 is applied effectively to the arm 5a even if the framing bars F1 and F2 are disassembled and assembled repeatedly.

Figure 6:
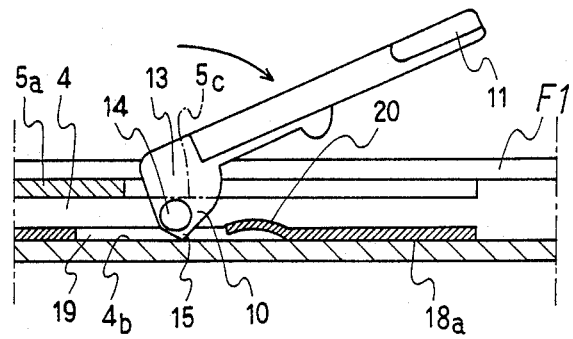
FIGS. 6 and 7 are enlarged sectional views of for explaining the manner of operation of the lever of the framing bar connector of FIG. 1.

The cam 13 is designed so that the cam 13 does not engage both the bottom surface 4b of the dovetail groove 4 and the lower surface of the arm 5a until the lever 2 is turned to a position, as shown in FIG. 6, which position is immediately before a final position where the lug 11 of the lever 2 rests on the outer surface of the edge of the dovetail groove 4 as shown in FIG. 7. Therefore, the nose 15 of the cam 13 will not cut deep in the bottom surface 4b of the dovetail groove 4 and the lever 2 can be smoothly turned. The rib 9a of the stem 9 is formed so as to closely or snugly fit the slot 6 to prevent the lever 2 from being raised accidentally. The protrusion 12 facilitates the entrance of the rib 9a into the slot 6. Since the idle movement of the lever 2 is restricted by the engagement of the cam 13 with the bottom plate 3, the rib 9a fits correctly in the slot 6.

Figure 8:
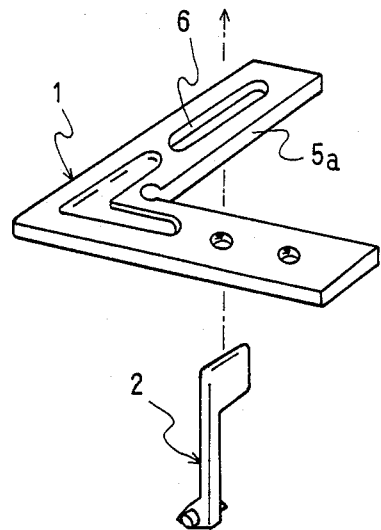
FIG. 8 is a perspective view of a variation of the framing bar connector of FIG. 1.

FIG. 8 shows a connecting plate 1 and a lever 2 of a framing bar connector P employed in a variation of the present invention. A closed-end slot 6 is formed in the arm 5a of the connecting plate 1, and the lever 2 is formed so as to be able to be passed through the slot 6 from below the arm 5a and is not provided with any protrusion such as the protrusion 12 in FIG. 2. The variation of FIG. 8 otherwise structurally and functionally corresponds to the embodiment of FIGS. 1–7.

Figure 9:
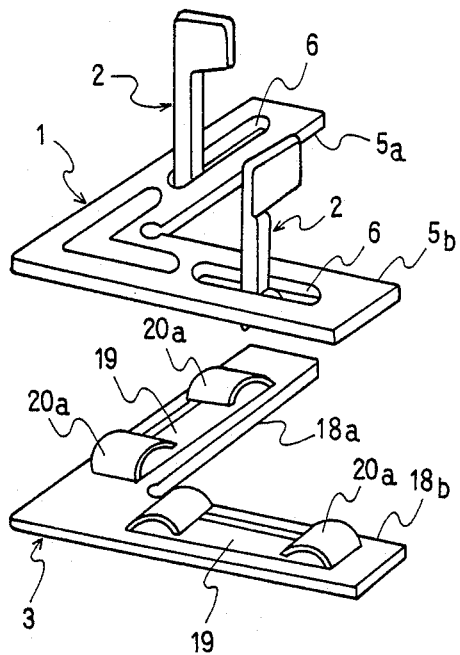
FIG. 9 is a perspective view of a further framing bar connector employed in the present invention.

FIG. 9 shows a framing member connector P employed in a further embodiment of the present invention. The framing bar connector P comprises an L-shaped connecting plate 1 having right-angled arms 5a and 5b, two levers 2, and an L-shaped bottom plate 3 having right-angled arms 18a and 18b. Slots 6 are formed in both the arms 5a and 5b of the connecting plate 1, respectively. An opening 19 is formed in each of the arms 18a and 18b of the bottom plate 3 and portions of each of the arms 18a and 18b at the opposite ends of the opening 19 are raised by pressing to form stoppers 20a which also serve as means for resiliently pressing the connecting plate 1 against the inner surfaces of the edges of the dovetail groove 4 to hold the connecting plate 1 and the bottom plate 3 temporarily in the dovetail grooves 4 of the adjacent framing members F1 and F2. The levers 2 are substantially the same as that shown in FIG. 8. In this embodiment, similarly to the foregoing embodiments, the connecting plate 1 is secured firmly to the adjacent framing bars F1 and F2 by turning the lever 2.

As apparent from the foregoing description, according to the present invention, the nose of the cam catches the bottom surface of the dovetail groove of the framing member firmly when the lever is turned half way, and then the lever is turned further on the nose while the pivots laterally extending from the cam slide along the lower surface of the arm of the connecting plate. Accordingly, the nose of the cam will not cut deep in the bottom surface of the dovetail groove and the lever is able to be turned lightly, so that the lever will not be broken and the bottom surface of the dovetail groove will not be scraped by the nose of the cam. Thus, the fastening force of the cam acts effectively on the connecting plate and is maintained even if the frame is disassembled and assembled repeatedly.

Although the invention has been described in its preferred forms with a certain degree of particularity, it is to be understood to the skilled in the art that many changes and variations are possible in the invention without departing from the scope and spirit thereof.

What is claimed is:

1. A framing bar connecting method for forming a frame by firmly connecting adjacent framing bars each having dovetail grooves on the backside thereof with framing bar connectors each comprising: an L-shaped connecting plate having right-angled first and second arms which can be received in the dovetail grooves of the adjacent framing bars, respectively, a slot formed in the first arm and a plurality of threaded holes formed in the second arm; an L-shaped bottom plate formed in substantially the same shape as that of the connecting plate, having right-angled first and second arms, an opening formed the first arm, and a stopper formed by raising part of the first arm at the outer end of the opening; a lever having a cam having a nose and formed at the base end thereof so as to project from the base end in a direction in which the lever is turned to fasten the connecting plate to the framing bar, a protrusion formed at the middle part thereof so as to protrude in a direction in which the lever is turned to fasten the connecting plate to the framing bar, a rib formed adjacent to the protrusion so as to protrude in a direction in which the lever is turned to fasten the connecting plate to the framing bar, and pivots laterally projecting from the opposite sides of the cam; and screws to be screwed in the threaded holes formed in the other arm of the connecting plate; which method comprises the steps of:

combining the connecting plate and the lever by inserting the lever in the slot so that the cam is placed below the first arm of the connecting plate and the lever extends upward through the slot;

inserting the second arm of the connecting plate and the second arm of the bottom plate in the dovetail groove of one of the framing bars;

screwing the screws through the threaded holes of the second arm of the connecting plate so that the second arm of the bottom plate is pressed against the bottom surface of the dovetail groove and the second arm of the connecting plate is pressed against the respective inner surfaces of the edges of the dovetail groove so that the second arm of the connecting plate and the second arm of the bottom plate are secured firmly to one of the framing bars;

inserting the first arm of the connecting plate and the first arm of the bottom plate together with the lever into the dovetail groove of the other framing bar so that the cam is located in the opening formed in the first arm of the bottom plate;

turning down the lever so that the nose of the cam catches the bottom surface of the dovetail groove and the pivots slide along the lower surface of the first arm of the connecting plate so that the first arm of the connecting plate is pressed against the respective inner surfaces of the edges of the dovetail groove.

2. A method according to claim 1, wherein the slot opens outwardly through the free end of the first arm of the L-shaped connecting plate.

3. A framing bar connecting method for forming a frame by firmly connecting adjacent framing bars each having dovetail grooves on the backside thereof with framing bar connectors each comprising: an L-shaped connecting plate having right-angled first and second arms which can be received in the dovetail grooves of the adjacent framing bars, respectively, a slot formed in the first arm and a plurality of threaded holes formed in the second arm; an L-shaped bottom plate formed in substantially the same shape as that of the connecting plate, having right-angled first and second arms, an opening formed the first arm, and a stopper formed by raising part of the first arm at the outer end of the opening; a lever having a cam having a nose and formed at the base end thereof so as to project from the base end in a direction in which the lever is turned to fasten the connecting plate to the framing bar, and pivots laterally projecting from the opposite sides of the cam; and screws to be screwed in the threaded holes formed in the other arm of the connecting plate; which method comprises the steps of:

combining the connecting plate and the lever by inserting the lever in the slot so that the cam is placed below the first arm of the connecting plate and the lever extends upward through the slot;

inserting the second arm of the connecting plate and the second arm of the bottom plate in the dovetail groove of one of the framing bars;

screwing the screws through the threaded holes of the second arm of the connecting plate so that the second arm of the bottom plate is pressed against the bottom surface of the dovetail groove and the second arm of the connecting plate is pressed against the respective inner surfaces of the edges of the dovetail groove so that the second arm of the connecting plate and the second arm of the bottom plate are secured firmly to one of the framing bars;

inserting the first arm of the connecting plate and the first arm of the bottom plate together with the lever into the dovetail groove of the other framing bar so that the cam is located in the opening formed in the first arm of the bottom plate;

turning down the lever so that the nose of the cam catches the bottom surface of the dovetail groove and the pivots slide along the lower surface of the first arm of the connecting plate so that the first arm of the connecting plate is pressed against the respective inner surfaces of the edges of the dovetail groove.

4. A method according to claim 3, wherein the slot as formed in the first arm of said connecting plate is closed at opposite ends so that the lever is inserted into the slot by being passed upwardly from below the first arm.

5. A method according to claim 3, wherein the slot as formed in the first arm of said connecting plate opens outwardly through the free end of said first arm so that the lever can be inserted into said slot through the open end thereof.

* * * * *